United States Patent
Zhang et al.

(10) Patent No.: US 11,753,346 B2
(45) Date of Patent: Sep. 12, 2023

(54) METHOD FOR THE CONSTRUCTION OF A DATA CENTER

(71) Applicant: HOLCIM TECHNOLOGY LTD, Zug (CH)

(72) Inventors: Qing Zhang, Holderbank (CH); Anthony Peuchlestrade, Holderbank (CH); Antoine Creyx, Holderbank (CH); Fabrice Toussaint, Holderbank (CH); Joanne Wise, Holderbank (CH); Christophe Levy, Holderbank (CH)

(73) Assignee: HOLCIM TECHNOLOGY LTD, Zug (CH)

( * ) Notice: Subject to any disclaimer, the term of this patent is extended or adjusted under 35 U.S.C. 154(b) by 309 days.

(21) Appl. No.: 17/126,970

(22) Filed: Dec. 18, 2020

(65) Prior Publication Data
US 2022/0194865 A1 Jun. 23, 2022

(51) Int. Cl.
| | |
|---|---|
| *C04B 40/00* | (2006.01) |
| *C04B 18/02* | (2006.01) |
| *C04B 14/06* | (2006.01) |
| *C04B 14/28* | (2006.01) |
| *C04B 40/06* | (2006.01) |
| *E04H 5/00* | (2006.01) |
| *C04B 28/04* | (2006.01) |
| *C04B 111/00* | (2006.01) |
| *C04B 103/30* | (2006.01) |
| *C04B 103/32* | (2006.01) |
| *C04B 111/60* | (2006.01) |

(52) U.S. Cl.
CPC .......... *C04B 40/0039* (2013.01); *C04B 14/06* (2013.01); *C04B 14/28* (2013.01); *C04B 18/021* (2013.01); *C04B 28/04* (2013.01); *C04B 40/0625* (2013.01); *E04H 5/00* (2013.01); *C04B 2103/302* (2013.01); *C04B 2103/32* (2013.01); *C04B 2111/00603* (2013.01); *C04B 2111/00637* (2013.01); *C04B 2111/60* (2013.01); *C04B 2201/20* (2013.01); *C04B 2201/32* (2013.01); *E04H 2005/005* (2013.01)

(58) Field of Classification Search
CPC ..... C04B 40/0039; C04B 14/06; C04B 14/28; C04B 18/021; C04B 28/04; C04B 40/0625; C04B 2103/302; C04B 2103/32; C04B 2111/00603; C04B 2111/00637; C04B 2111/60; C04B 2201/20; C04B 2201/32; E04H 5/00; E04H 5/02; E04H 2005/005

See application file for complete search history.

(56) References Cited

U.S. PATENT DOCUMENTS

| | | | |
|---|---|---|---|
| 4,188,231 A | 2/1980 | Valore | |
| 5,584,926 A | 12/1996 | Borgholm | |
| 7,581,903 B1 | 9/2009 | Scola | |
| 10,385,519 B2 | 8/2019 | Yuan | |
| 2008/0000391 A1 | 1/2008 | Drochon | |
| 2010/0081733 A1 | 4/2010 | Michaux | |
| 2011/0155019 A1 | 6/2011 | Albright | |
| 2012/0205105 A1 | 8/2012 | Le Roy-Delage | |
| 2015/0041134 A1 | 2/2015 | Carelii | |
| 2015/0203406 A1* | 7/2015 | Bernardi | C04B 28/04 106/789 |
| 2016/0060169 A1 | 3/2016 | Byrd | |
| 2017/0179705 A1 | 6/2017 | Wilkins | |
| 2017/0267593 A1 | 9/2017 | Li | |
| 2020/0040574 A1* | 2/2020 | Ekster | B32B 3/08 |

FOREIGN PATENT DOCUMENTS

| | | | | |
|---|---|---|---|---|
| EP | 0 774 446 A1 | 5/1997 | | |
| EP | 3 223 380 A1 | 9/2017 | | |
| WO | WO-2011104810 A1 * | 9/2011 | | E04C 5/03 |
| WO | WO 2016/180999 A1 | 11/2016 | | |
| WO | WO 2016/189373 A1 | 12/2016 | | |
| WO | WO-2017025770 A1 * | 2/2017 | | C04B 14/06 |

OTHER PUBLICATIONS

Non-Final Office Action as issued in U.S. Appl. No. 16/441,714, dated Feb. 23, 2021.
Notice of Allowance as issued in U.S. Appl. No. 16/441,714, dated May 20, 2021.

* cited by examiner

*Primary Examiner* — Anthony J Green
(74) *Attorney, Agent, or Firm* — Pillsbury Winthrop Shaw Pittman LLP

(57) ABSTRACT

A method for the construction of a data center, includes (a) providing a fresh concrete composition including a paste that includes a hydraulic binder, a mineral addition and water, the paste being present in a mixture with sand and aggregates, whereby the paste is present in the concrete composition in a volume of <320 L/m$^3$ and/or the solid volume fraction of said paste is >50 vol.-% and (b) placing the fresh concrete composition so as to build walls, a floor and/or a ceiling of the data center, which are intended to surround the individual components of computer systems, which are housed in the data center.

18 Claims, No Drawings

METHOD FOR THE CONSTRUCTION OF A DATA CENTER

FIELD

The invention relates to a method for the construction of a data center, comprising the step of
(a) providing a fresh concrete composition comprising a paste that comprises a hydraulic binder, a mineral addition and water, said paste being present in a mixture with sand and aggregates.

BACKGROUND

A "data center" is a building, a dedicated space within a building, or a group of buildings used to house computer systems and their associated components.

Such associated components may e.g. be the hardware, the operating system (main software), and the peripheral equipment required and used for the full operation of a computer system.

The term "computer system" is e.g. used to define a group of computers that are connected and work together, in particular a computer network or a computer cluster.

The construction of a data center brings some technical challenges, the main one being heat dissipation. The heat generated by the computer systems, which are housed in the data center, or their associated components, can be significant. The generated heat must be allowed to dissipate, as the build-up of heat inside the data center would otherwise result in physical impairment of the individual components.

Concrete, through adaptations of its composition, has the advantage of being a very versatile material, as it may provide excellent physical protection and/or enable good heat dissipation.

Concrete is a very widely used construction material with high ultimate strength and excellent durability. Furthermore, the material is able to flow while in its fresh state, enabling it to be easily transported, pumped, and placed before the setting and hardening actually take place. In addition to aggregates and water, it also contains a hydraulic binder such as Portland cement, which produces strength-forming phases by solidifying and curing in contact with water. Concrete based on Portland cement clinker is thus one of the most important binders worldwide.

For applications related to the construction of data centers, the thermal resistivity, expressed in m·K/W, or the thermal conductivity, expressed in W/m·K, of the construction material, which surrounds the computer systems and their associated components, are of high importance. Construction materials of higher thermal resistivity prevent heat from being evacuated from the inside of the data centers to the surrounding environment. A construction material of low thermal resistivity would allow the construction of data centers at low cost or with smaller cross-sections, since no high volume of moving air that surrounds the computer systems and their components within the data centers is needed to efficiently dissipate the generated heat. Said effects enable the use of less amounts of raw materials, lower transportation costs and a more straightforward construction of data centers.

WO 2016/180999 A1 discloses structural concretes and mortars useful for example in geothermal foundations of buildings. The compositions comprise three to six components and the low thermal resistivity is due mainly to the presence of a carbon containing component, such as natural or synthetic graphite, graphene and/or carbon nanotubes.

In the embodiment as disclosed in WO 2016/180999 A1, the construction material used to build the geothermal foundations of buildings contains additional components that are required to sufficiently decrease the thermal resistivity of the construction material. This increases quite significantly the cost of the material, and poses additional issues related to sourcing the material. There is therefore a need for construction materials that have a low thermal resistivity and do not require the use of special carbon rich components.

SUMMARY

An aspect of this invention is directed to providing a construction material that does not require the use of any carbon rich material, while providing sufficiently low thermal resistivity values for the construction of data centers.

In order to reach this objective, an embodiment of the invention provides for a method for the construction of a data center, comprising the steps of
(a) providing a fresh concrete composition comprising a paste that comprises a hydraulic binder, a mineral addition and water, said paste being present in a mixture with sand and aggregates, wherein the paste is present in the fresh concrete composition in a volume of <320 L/m$^3$ and/or the solid volume fraction of said paste is >50 vol.-%, and
(b) placing the fresh concrete composition so as to build walls, a floor and/or a ceiling of the data center, which are intended to surround the individual components of computer systems, which are housed in the data center.

Preferably, the method further comprises arranging computer systems in the data center so as to be surrounded by the walls, floor and/or ceiling.

Minimizing the paste volume in the fresh concrete composition and maximizing the solid volume fraction of the paste each result in an increased overall content of the solid volume fraction of the fresh concrete composition, thereby reducing the water content. In particular, the fresh concrete composition of an aspect of the invention minimizes the amount of excess water that is not consumed by the hydration reaction and that may otherwise result in microscopic pores present in the concrete once hardened and dried.

In particular, it has been found that either selecting a paste volume in the fresh concrete composition of below 320 L/m$^3$ or selecting the solid volume fraction of the paste above 50 vol.-% results in a sufficiently low thermal resistivity of the concrete once hardened and dried, and in particular results in a thermal resistivity of below 0.7 m·K/W, in particular below 0.6 m·K/W. Even better results may be achieved, if both measures are take simultaneously, i.e. the paste volume in the fresh concrete composition is kept below 320 L/m$^3$ and the solid volume fraction of the paste is selected above 50 vol.-%.

By the instant invention the presence of carbon containing additives in the concrete composition for lowering thermal resistivity of the surrounding material may be avoided.

The solid volume fraction of the paste designates the volume content of all solid fractions in the paste, wherein the solid fractions comprise the hydraulic binder and the mineral addition(s), such as the limestone filler, silica flour and/or a hematite filler, but does not include sand and aggregates, since these latter components do not form part of the paste. The hydraulic binder and the mineral additions used for the calculation of the solid volume fraction have a maximum particle diameter of 0.25 mm.

According to an embodiment, the paste is present in the fresh concrete composition in a volume of <300 L/m$^3$, for example <280 L/m$^3$, and in another example <250 L/m$^3$.

If the paste is present in the fresh concrete composition in a volume of <300 L/m$^3$, the lower limit for the solid volume fraction of the paste can be reduced to 45 vol.-%.

In any case, maximizing the solid volume fraction of the paste will result in a particularly low thermal resistivity, wherein an embodiment provides for a solid volume fraction of the paste of >55 vol.-%, for example >60 vol.-%.

As to the reduced water content of the composition, an embodiment of the inventions provides that water is present in the fresh concrete composition in a volume of <170 L/m$^3$, for example <140 L/m$^3$, for example <125 L/m$^3$, and in another example <100 L/m$^3$.

Accordingly, in a separate aspect of the present invention, a fresh concrete composition is used for the construction of data centers, comprising a paste that comprises a hydraulic binder, a mineral addition and water, said paste being present in a mixture with sand and aggregates, wherein water is present in the fresh concrete composition in a volume of <170 L/m$^3$, for example <140 L/m$^3$, for example <125 L/m$^3$, and in another example <100 L/m$^3$.

A low water content reduces the workability of the fresh concrete. In order to improve the workability of the fresh concrete mass, the mixture may comprise a water reducer, in particular a plasticiser or super-plasticiser, such as a polycarboxylate-based or a polynaphthalene sulfonate-based water reducer. A water reducer is a formulated product, most often in liquid form, that allows for reducing the amount of mixing water for a given workability or to increase flowability for a given water/binder ratio. By way of example of water reducers, mention may be made of lignosulphonates, hydroxycarboxylic acids, carbohydrates, and other specific organic compounds, for example glycerol, polyvinyl alcohol, sodium alumino-methyl-siliconate, sulfanilic acid and casein.

A water reducer is typically in liquid form, and is an aqueous formulation that has a solid content, or a dry extract, comprised between 15 and 40 wt.-%.

Super-plasticisers belong to a new class of water reducers and allow for reducing the amount of mixing water, for a given workability, by approximately 30 wt.-%. By way of example of a superplasticizer, the PCP super-plasticisers may be noted. The term "PCP" or "polyoxy polycarboxylate" is to be understood according to the present invention as a copolymer of acrylic acids or methacrylic acids and their esters of polyoxyethylene (POE).

In an embodiment, the composition comprises 1.5 to 12 kg per m$^3$ of the fresh concrete composition of a water reducer, a plasticizer and/or a superplasticizer, which is in a liquid form.

A low content of hydraulic binder in the fresh concrete composition may entail the risk of segregation of some components in the fresh concrete mixture. In order to prevent segregation, the mixture may comprise a viscosity modifying agent, such as a high molecular weight gum.

The term fresh concrete as used herein designates the wet mix of concrete ingredients before they begin to set. In other words, fresh concrete is that stage of concrete, in which concrete can be moulded and is in its plastic state.

According to an embodiment of the invention, the hydraulic binder comprises Portland cement. In an embodiment, cement of the types CEM I, CEM II, CEM III, CEM IV or CEM V can be used. For example, the hydraulic binder is a cement of the type CEM I, CEM II or CEM III. In another example, the hydraulic binder is a cement, that comprises >95 wt.-% of Portland cement.

The European norm EN 197-1 of April 2012 defines five classes of common cement that comprise Portland cement as a main constituent.

CEM I (Portland cement) comprising Portland cement and up to 5 wt.-% of minor additional constituents, CEM II (Portland-composite cement) comprising Portland cement and up to 35 wt.-% of other single constituents, CEM III (Blast furnace cement) comprising Portland cement and higher percentages of blast furnace slag, CEM IV (Pozzolanic cement) comprising Portland cement and up to 55 wt.-% of pozzolanic constituents, CEM V (Composite cement) comprising Portland cement, blast furnace slag or fly ash and pozzolans.

Alternatively, the hydraulic binder used in an embodiment of the invention is a cement that is prepared by mixing Portland cement with a mineral component such a ground slag, fly ash, ground limestone, or pozzolanic constituents or a mixture thereof. The mixing step of Portland cement and mineral components can for example be carried out while preparing the concrete.

In order to obtain a concrete having a sufficient compressive strength, the hydraulic binder, in particular Portland cement, is in an embodiment present in the fresh concrete composition in an amount of 150-500 kg/m$^3$. Such a concrete may have a 28d compressive strength of >20 MPa.

In order to minimize the paste volume of the concrete, the aggregate skeleton packing density may be maximized. In an embodiment, the skeleton packing density of the aggregate is selected to be >0.69, for example >0.71.

One possible way of maximizing the skeleton density of the aggregate is to use natural (and therefore rounded) sand instead of manufacture sand.

In order to maximize the solid volume fraction of the paste, fine mineral additives may be present in the paste. In an embodiment, a limestone filler or a siliceous filler (fine quartz and/or silica flour) or a mixture of limestone filler and a siliceous filler is used as the mineral addition.

In an embodiment, the mineral additive, in particular the limestone filler, has a particle size distribution that is characterised by a D50 of ≤10 μm, for example 5-10 μm, and/or a D98 of ≤100 μm, for example 90-100 μm.

According to an embodiment of the invention, the mineral addition comprises a hematite filler. In particular, a hematite filler is used as the mineral addition. Hematite is a mineral form of iron(III) oxide ($Fe_2O_3$) and has the effect of further reducing the thermal resistivity of the concrete.

In an embodiment, a magnetite sand and/or magnetite aggregate is used. Magnetite ($Fe_3O_4$) also is useful for reducing the thermal resistivity of the concrete.

An embodiment of the invention provides a construction material that has a particularly low thermal resistivity. In an embodiment, the fresh concrete, after having been placed, is allowed to harden and dry, wherein the thermal resistivity of the concrete once hardened and dried is <0.7 m·K/W, for example <0.6 m·K/W, for example <0.5 m·K/W, and in another example <0.4 m·K/W.

An embodiment of the invention provides a fresh concrete composition that allows to use ordinary materials that are easily available in concrete plants, such as natural or manufactured sand, lime/siliceous aggregate, cement, lime/siliceous filler. In particular, the fresh concrete composition can be free from a material having a thermal conductivity of >10 W/m·K, for example >20 W/m·K, such as a carbon containing component, such as natural or synthetic graphite, graphene and/or carbon nanotubes. The fresh concrete composition is also free of metals, such as steel or aluminium, in the form of fibres or particles.

However, the invention does not exclude the presence of a carbon containing component, such as natural or synthetic graphite, graphene and/or carbon nanotubes, in order to further reduce the thermal resistivity.

DETAILED DESCRIPTION

The invention will now be described in more detail with reference to the following examples.

In the examples fresh concrete compositions were mixed according to the following process. The fresh concrete mixes were obtained by means of a ZYCLOS type mixer. The whole operation has been carried out at 20° C. The method of preparation comprises the following steps:

- At T=0 seconds: charging the cement and the sand in a bowl mixer and mixing during 7 minutes (15 rpm);
- At T=7 minutes: adding water and half of the weight of additive (superplasticizer) and mix for 1 minute (15 rpm);
- At T=8 minutes: adding the rest of the additive (superplasticizer) and mix for 1 minute (15 rpm);
- At T=9 minutes: mixing for 8 minutes (50 rpm); and
- At T=17 minutes: mixing for 1 minute (15 rpm);
- At T=18 minutes: pouring the concrete on the level into a mould.

The performance of the fresh concrete mixes was measured according to the following process. Concrete slump and strength measurements were carried out as described in the standard NF EN 206 published in November 2016. Strength was measured on 10 cm×10 cm×10 cm cubes. The thermal resistivity, including definition of the dry state, was measured using a Decagon device (KD2 pro with probe RK-1) according to the standard IEEE 442, on concrete cubes (10 cm×10 cm×10 cm) dried at 105° C. until constant mass and cooled in desiccator to room temperature.

In the examples below, the thermal resistivity is measured when the material is dry as described above. If the material still contains some free water, the thermal resistivity would decrease.

Example 1

Fresh compositions for concrete with the mix designs indicated in Table 1 have been prepared and allowed to harden and dry. The performance parameters of the concrete compositions have been determined and are listed in Table 2.

An analysis of the examples allows to draw the following conclusions.

Mix design C02 is a prior art mix design with limestone as a mineral filler material.

In the mix design C03, limestone filler was replaced by fly ash, wherein the performance measurements show that the thermal resistivity did not decrease, but increased.

A comparison of the mix designs C04 and C05 with C02 shows that reducing the water content of the fresh concrete composition results in a reduction of the thermal resistivity, and also increases the compressive strength.

A comparison of the mix designs C12 and C14 reveals that reducing the paste volume (i.e. the volume of water, binder and limestone filler) decreases the thermal resistivity.

A comparison of the mix designs C13 and C13B shows the effect of the type of gravel, wherein using a siliceous type gravel (sourced from La Gerbaudière) results in a reduced thermal resistivity when compared to a siliceous-lime gravel (sourced from Saint Bonnet).

A comparison of the mix designs C23 and C23B shows the effect of the type of sand on the thermal resistivity, wherein natural rounded sand results in a reduced thermal resistivity when compared to manufactured and washed sand.

The mix design C41 was identified as the reference mix design having a very low thermal resistivity of 0.47 (m·K)/W.

With the mix design C41 Sflour, the limestone filler was partly replaced by silica flour, in order to further decrease thermal resistivity.

The mix design C41 MAGN shows that the use of $Fe_3O_4$ sands and gravel further decreases the thermal resistivity.

With the mix design C41 Hema, the limestone filler was partly replaced by a $Fe_2O_3$ filler, which further decreases the thermal resistivity.

A comparison of the mix designs C11 and C41 shows that the use of carbon can be avoided by mix design optimization, the specific concrete mix design is more important than the conductive additives.

TABLE 1

| | Unit | C02 | C03 | C04 | C05 | C11 | C12 | C14 | C13 | C13B |
|---|---|---|---|---|---|---|---|---|---|---|
| CEM I - CEM I 52.5 N Saint Pierre La Cour | kg/m³ | 40 | 40 | 40 | 40 | 25 | 41 | 36 | 39 | 39 |
| Limestone filler St beat Omya | kg/m³ | 360 | 0 | 0 | 0 | 0 | 0 | 0 | 0 | 0 |
| Limestone filler Cat. A - BL200 (Omya) | kg/m³ | 0 | 0 | 405 | 460 | 360 | 373 | 322 | 351 | 351 |
| Fly ash Cordemais | kg/m³ | 0 | 360 | 0 | 0 | 0 | 0 | 0 | 0 | 0 |
| Silica flour (siliceous fine filler) | kg/m³ | 0 | 0 | 0 | 0 | 0 | 0 | 0 | 0 | 0 |
| Hematite filler | kg/m³ | 0 | 0 | 0 | 0 | 0 | 0 | 0 | 0 | 0 |
| Synthetic graphite | kg/m³ | 0 | 0 | 0 | 0 | 100 | 0 | 0 | 0 | 0 |
| Micro sand Sibelco Be01 | kg/m³ | 182 | 167 | 184 | 184 | 184 | 179 | 192 | 193 | 193 |
| Crushed and washed sand 0/4 (Petit Craz) | kg/m³ | 0 | 0 | 0 | 0 | 0 | 0 | 0 | 779 | 779 |
| Natural sand 0/5 (Saint Bonnet) | kg/m³ | 734 | 674 | 742 | 742 | 756 | 720 | 773 | 0 | 0 |
| Aggregates 5/10 (Saint Bonnet) | kg/m³ | 788 | 723 | 797 | 797 | 815 | 773 | 831 | 837 | 0 |
| Aggregates 4/10 (La Gerbaudière) | kg/m³ | 0 | 0 | 0 | 0 | 0 | 0 | 0 | 0 | 985 |
| $F_3O_4$ sand 0/2 (Garrot-Chaillac) | kg/m³ | 0 | 0 | 0 | 0 | 0 | 0 | 0 | 0 | 0 |
| $F_3O_4$ sand 0/6 (Garrot-Chaillac) | kg/m³ | 0 | 0 | 0 | 0 | 0 | 0 | 0 | 0 | 0 |
| $F_3O_4$ sand 4/16 (Garrot-Chaillac) | kg/m³ | 0 | 0 | 0 | 0 | 0 | 0 | 0 | 0 | 0 |
| Superplasticizer Chryso Optima 203 | kg/m³ | 4 | 0 | 1.78 | 2.00 | 1.54 | 1.24 | 1.43 | 5.60 | 5.60 |

TABLE 1-continued

|  | Unit | | | | | | | | |
|---|---|---|---|---|---|---|---|---|---|
| Kelcocrete (viscosity modifying agent) | kg/m³ | 0 | 0 | 0 | 0 | 0 | 0 | 0 | 0 | 0 |
| Superplasticizer Chryso Optima 206 | kg/m³ | 0 | 5.5 | 0 | 0 | 0 | 0 | 0 | 0 | 0 |
| Total effective water | L/m³ | 175 | 204 | 154 | 134 | 115 | 183 | 155 | 138 | 138 |
| Air | L/m³ | 20 | 20 | 20 | 20 | 20 | 20 | 20 | 20 | 20 |

|  | Unit | C41 | C23 | C23B | C41 Hema | C41 Slfour | C41 MAGN |
|---|---|---|---|---|---|---|---|
| CEM I - CEM I 52.5 N Saint Pierre La Cour | kg/m³ | 15 | 36 | 36 | 15 | 15 | 15 |
| Limestone filler St beat Omya | kg/m³ | 0 | 0 | 0 | 0 | 0 | 0 |
| Limestone filler Cat. A - BL200 (Omya) | kg/m³ | 370 | 415 | 415 | 248 | 248 | 370 |
| Fly ash Cordemais | kg/m³ | 0 | 0 | 0 | 0 | 0 | 0 |
| Silica flour (siliceous fine filler) | kg/m³ | 0 | 0 | 0 | 0 | 116 | 0 |
| Hematite filler | kg/m³ | 0 | 0 | 0 | 196 | 0 | 0 |
| Synthetic graphite | kg/m³ | 0 | 0 | 0 | 0 | 0 | 0 |
| Micro sand Sibelco Be01 | kg/m³ | 79 | 192 | 192 | 79 | 79 | 0 |
| Crushed and washed sand 0/4 (Petit Craz) | kg/m³ | 681 | 0 | 773 | 681 | 681 | 0 |
| Natural sand 0/5 (Saint Bonnet) | kg/m³ | 0 | 773 | 0 | 0 | 0 | 0 |
| Aggregates 5/10 (Saint Bonnet) | kg/m³ | 1175 | 831 | 831 | 1175 | 1175 | 0 |
| Aggregates 4/10 (La Gerbaudière) | kg/m³ | 0 | 0 | 0 | 0 | 0 | 0 |
| $F_3O_4$ sand 0/2 (Garrot-Chaillac) | kg/m³ | 0 | 0 | 0 | 0 | 0 | 1033 |
| $F_3O_4$ sand 0/6 (Garrot-Chaillac) | kg/m³ | 0 | 0 | 0 | 0 | 0 | 1590 |
| $F_3O_4$ sand 4/16 (Garrot-Chaillac) | kg/m³ | 0 | 0 | 0 | 0 | 0 | 1056 |
| Superplasticizer Chryso Optima 203 | kg/m³ | 7.70 | 1.43 | 1.43 | 7.70 | 7.70 | 7.70 |
| Kelcocrete (viscosity modifying agent) | kg/m³ | 0.0015 | 0.0036 | 0.0036 | 0.0015 | 0.0015 | 0.0015 |
| Superplasticizer Chryso Optima 206 | kg/m³ | 0 | 0 | 0 | 0 | 0 | 0 |
| Total effective water | L/m³ | 90 | 121 | 121 | 90 | 90 | 90 |
| Air | L/m³ | 20 | 20 | 20 | 20 | 20 | 20 |

TABLE 2

| Unit | Thermal resistivity at dry state (m · K)/W | Slump cm | Compressive strength at 28 days MPa | Paste volume without air L/m³ | Solid volume fraction of paste % |
|---|---|---|---|---|---|
| C02 | 0.81 | >20 | 2.0 | 320 | 45.3 |
| C03 | 0.90 | >20 | 2.0 | 358 | 43.0 |
| C04 | 0.62 | >20 | 2.7 | 316 | 51.2 |
| C05 | 0.56 | >20 | 4.9 | 316 | 57.6 |
| C11 | 0.52 | >20 | 1.9 | 301 | 61.8 |
| C12 | 0.84 | >20 | 1.1 | 333 | 45.1 |
| C14 | 0.66 | >20 | 1.5 | 285 | 45.6 |
| C13 | 0.69 | >20 | 2.0 | 280 | 50.6 |
| C13B | 0.63 | >20 | 2.0 | 280 | 50.6 |
| C41 | 0.47 | >20 | 2.0 | 231 | 61.0 |
| C23 | 0.54 | >20 | 1.9 | 285 | 57.5 |
| C23B | 0.65 | >20 | 4.9 | 285 | 57.5 |
| C41 Hema | 0.44 | >20 | 1.9 | 228 | 60.5 |
| C41 Sfour | 0.45 | >20 | 2.0 | 229 | 60.7 |
| C41 MAGN | 0.46 | >20 | 1.7 | 231 | 61.0 |

TABLE 3

| Material | Dosage, kg/m³ |
|---|---|
| Cement (CEM I) | 220 |
| Limestone filler BL 200 Orgon | 281 |
| silica fume | 22 |
| Washed sand 0/4 | 682 |
| Natural round gravel (5/10) | 1051 |
| Superplasticizer (Chryso Optima 100) | 11 |
| Effective water | 129 |
| Paste volume | 310 L/m³ |
| Paste solid volume fraction (without air) | 0.59 |
| Aggregate packing density | 0.68 |
| Slump | 25 cm |
| Thermal resistivity at dry state | 0.35 m · K/W |
| compressive strength at 28 day | 60 MPa |

TABLE 4

| Material | Dosage, kg/m³ |
|---|---|
| Cement (CEM I) | 159 |
| limestone filler saint Beat | 220 |
| silica fume | 55.9 |
| ultrafine limestone filler omyacoat 850 | 73.1 |
| fine sand la sablière CCSH | 132.3 |
| washed sand 0/4 | 682 |
| natural round gravel (5/20) | 1080 |
| superplasticizer (Chryso Optima 100) | 11 |
| effective water | 127 |
| Paste volume | 309 L/m³ |

Examples 2

Fresh compositions for concrete with the mix designs indicated in tables 3 to 6 have been prepared and allowed to harden and dry. The performance parameters of the concrete compositions have been determined and are also listed in tables 3 to 6.

TABLE 4-continued

| Material | Dosage, kg/m³ |
|---|---|
| paste solid volume fraction (without air) | 0.59 |
| slump | >25 cm |
| aggregate packing density | 0.71 |
| thermal resistivity at dry state | 0.31 m · K/W |
| compressive strength at 28 day | 70 MPa |

TABLE 5

| Material | Dosage, kg/m³ |
|---|---|
| Cement (CEM I) | 207 |
| Fine limestone filler Betoflow D SL | 297 |
| silica fume | 39 |
| washed sand 0/4 | 687 |
| natural round gravel (5/10) | 1066 |
| superplasticizer (Chryso Optima 203) | 5.4 |
| effective water | 105 |
| Paste volume | 298 L/m³ |
| paste solid volume fraction (without air) | 0.64 |
| slump | >25 cm |
| aggregate packing density | 0.68 |
| thermal resistivity at dry state | 0.33 m · K/W |
| compressive strength at 28 day | 76 MPa |

TABLE 6

| Material | Dosage, kg/m³ |
|---|---|
| Cement (CEM I) | 462 |
| silica fume | 30 |
| washed sand 0/4 | 687 |
| natural round gravel (5/10) | 1066 |
| superplasticizer (Chryso Optima 203) | 4.9 |
| effective water | 138 |
| Paste volume | 298 L/m³ |
| paste solid volume fraction (without air) | 0.54 |
| slump | >25 cm |
| aggregate packing density | 0.68 |
| thermal resistivity at dry state | 0.4 m · K/W |
| compressive strength at 28 day | 92 MPa |

The invention claimed is:

1. A method for the construction of a data center, comprising
   (a) providing a fresh concrete composition comprising a paste that comprises a hydraulic binder, a mineral addition other than sand and aggregates, and water, said paste being in a mixture with sand and aggregates, whereby the paste is present in the fresh concrete composition in a volume of <320 L/m³ and/or the solid volume fraction of said paste is >50 vol.-%, and
   (b) placing said fresh concrete composition so as to build walls, a floor and/or a ceiling of the data center, which are intended to surround individual components of computer systems, which are housed in the data center, wherein said sand and aggregates comprise magnetite sand and/or magnetite aggregate.

2. The method according to claim 1, wherein the paste is present in the fresh concrete composition in a volume of <300 L/m³.

3. The method according to claim 1, wherein the solid volume fraction of said paste is >55 vol.-%.

4. The method according to claim 1, wherein water is present in the fresh concrete composition in a volume of <170 L/m³.

5. The method according to claim 1, wherein the fresh concrete composition comprises 1.5 to 12 kg per m³ of the fresh concrete composition of a water reducer, a plasticizer or a superplasticizer.

6. The method according to claim 1, wherein Portland cement is used as said hydraulic binder.

7. The method according to claim 1, wherein the hydraulic binder is present in the fresh concrete composition in an amount of 150-500 kg/m³.

8. The method according to claim 1, wherein a limestone filler or a siliceous filler or a mixture of limestone filler and a siliceous filler is used as said mineral addition.

9. The method according to claim 8, wherein the mineral addition has a particle size distribution that is characterised by a D50 of ≤10 μm and/or a D98 of ≤100 μm.

10. The method according to claim 1, wherein a hematite filler is used as said mineral addition.

11. The method according to claim 1, wherein the skeleton packing density of the aggregate is selected to be >0.69.

12. The method according to claim 1, wherein the fresh concrete composition comprises a super-plasticiser.

13. The method according to claim 1, wherein the fresh concrete, after having been placed, is allowed to harden and dry, wherein the thermal resistivity of the concrete once hardened and dried is <0.7 m·K/W.

14. The method according to claim 13, wherein the 28d compressive strength of the concrete is >20 MPa.

15. The method according to claim 1, wherein the concrete composition is free from a material having a thermal conductivity of >10 W/m·K.

16. The method according to claim 15, wherein the concrete composition is free from a material having a thermal conductivity of >20 W/m·K.

17. The method according to claim 8, wherein said mineral addition includes fine quartz and/or silica flour.

18. A method for the construction of a data center, comprising
   (a) providing a fresh concrete composition comprising a paste that comprises a hydraulic binder, a mineral addition other than sand and aggregates, and water, said paste being in a mixture with sand and aggregates, whereby the paste is present in the fresh concrete composition in a volume of <300 L/m³ and the solid volume fraction of said paste is >45 vol.-%, and
   (b) placing said fresh concrete composition so as to build walls, a floor and/or a ceiling of the data center, which are intended to surround individual components of computer systems, which are housed in the data center, wherein said sand and aggregates comprise magnetite sand and/or magnetite aggregate.

* * * * *